US010240338B2

(12) United States Patent
Durst et al.

(10) Patent No.: US 10,240,338 B2
(45) Date of Patent: *Mar. 26, 2019

(54) TRANSPORTABLE MODULAR SYSTEM FOR COVERED ISOLATION OF ASSETS

(71) Applicant: The United States of America as Represented by The Secretary of The Army, Washington, DC (US)

(72) Inventors: Bartley P. Durst, Clinton, MS (US); Pamela Kinnebrew, Vicksburg, MS (US); Nicholas Boone, Vicksburg, MS (US); William Heard, Madison, MS (US); Thomas Slawson, Vicksburg, MS (US); Michael J. Roth, Raymond, MS (US); Omar Flores, Vicksburg, MS (US); Omar E. Esquilin-Mangual, Vicksburg, MS (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,016

(22) Filed: Dec. 3, 2012

(65) Prior Publication Data

US 2014/0130438 A1 May 15, 2014

Related U.S. Application Data

(60) Provisional application No. 61/565,596, filed on Dec. 1, 2011.

(51) Int. Cl.
*E04H 12/00* (2006.01)
*E04B 1/343* (2006.01)
*E04H 9/04* (2006.01)
*F41H 5/013* (2006.01)
*F41H 5/04* (2006.01)
*F41H 5/24* (2006.01)
*F42D 5/045* (2006.01)
*E04B 1/18* (2006.01)
*E04B 1/19* (2006.01)
*E04H 9/14* (2006.01)

(52) U.S. Cl.
CPC ............ *E04B 1/34331* (2013.01); *E04B 1/18* (2013.01); *E04B 1/1903* (2013.01); *E04H 9/04* (2013.01); *F41H 5/013* (2013.01); *F41H 5/04* (2013.01); *F41H 5/24* (2013.01); *F42D 5/045* (2013.01); *E04H 9/14* (2013.01); *Y02A 50/14* (2018.01)

(58) Field of Classification Search
CPC ....... E04B 1/18; E04B 1/1903; E04B 1/34331
USPC .................... 52/638, 79.5, 79.12, 79.13, 81.2
See application file for complete search history.

(56) References Cited

U.S. PATENT DOCUMENTS

| | | | | |
|---|---|---|---|---|
| 1,995,573 | A | * | 3/1935 | Matthews ....................... 52/79.9 |
| 3,417,518 | A | * | 12/1968 | Jaffe ................................. 52/7 |
| 3,430,398 | A | * | 3/1969 | Green ............................ 52/79.2 |
| 4,829,726 | A | * | 5/1989 | de Potter d'Indoye ........... 52/66 |
| 4,970,841 | A | * | 11/1990 | Zeigler ........................... 52/646 |

(Continued)

*Primary Examiner* — Basil S Katcheves
(74) *Attorney, Agent, or Firm* — Brian C. Jones (57) ABSTRACT

An easily assembled, transportable, re-deployable, modular, protective, double-roof system is disclosed which is compatible with other Modular Protective System (MPS) components and can be assembled in a variety of configurations to provide soldiers and equipment with protective enclosures.

14 Claims, 7 Drawing Sheets

(56) References Cited

U.S. PATENT DOCUMENTS

| | | | |
|---|---|---|---|
| 5,491,939 A * | 2/1996 | Wang | 52/185 |
| 5,765,248 A * | 6/1998 | Ono | 14/75 |
| 6,393,769 B1 * | 5/2002 | Mertik et al. | 52/7 |
| 6,499,705 B1 * | 12/2002 | Tsai | 248/167 |
| 7,100,332 B2 * | 9/2006 | Loesch | 52/79.5 |
| 7,647,731 B2 * | 1/2010 | Muir | 52/79.5 |
| D672,054 S * | 12/2012 | Mertik et al. | D25/18 |
| 8,397,441 B2 * | 3/2013 | Wallance | 52/79.1 |
| 8,464,493 B2 * | 6/2013 | Boone et al. | 52/646 |
| 2005/0229866 A1 * | 10/2005 | Simpson et al. | 119/499 |

* cited by examiner

TRANSPORTABLE MODULAR SYSTEM FOR COVERED ISOLATION OF ASSETS

RELATED APPLICATIONS

This application is related to U.S. patent application publication No. 2011/0005695 A1 filed Sep. 1, 2010 as a national stage under U.S.C. § 371, of International Application No. PCT/US09/35,703, filed Mar. 2, 2009, which claims the benefit under 35 U.S.C. § 119(e)(1) of U.S. Provisional Patent Application Ser. No. 61/033,061, Transportable Modular System Permitting Isolation of Assets, filed Mar. 3, 2008, all incorporated herein by reference. This application is also related to U.S. patent application publication No. 2011/0000514 A1 filed Sep. 1, 2010 as a national stage under U.S.C. § 371, of International Application No. PCT/US09/35,707, filed Mar. 2, 2009, which claims the benefit under 35 U.S.C. § 119(e)(1) of U.S. Provisional Patent Application Ser. No. 61/033,059, Transportable Modular Configuration for Holding Panels, filed Mar. 3, 2008, all incorporated herein by reference. This application is also related to U.S. Provisional Patent Application No. 61/033,240, Method of Manufacturing Cement Based Armor Panels filed Mar. 3, 2008; U.S. Pat. No. 8,030,377 B2, issued Oct. 4, 2011 which claims the benefit under 35 U.S.C. § 119(e)(1) of U.S. Provisional Patent Application No. 61/033,212, Self-Leveling Cementitious Composition with Controlled Rate of Strength Development and Ultra-High Compressive Strength upon Hardening and Articles Made from Same filed Mar. 3, 2008; U.S. Pat. No. 8,062,741 B2, issued Nov. 22, 2011 which claims the benefit under 35 U.S.C. § 119(e)(1) of U.S. Provisional Patent Application No. 61/033,264, Cement Based Laminated Armor Panels; and U.S. Pat. No. 8,061,257 B2, issued Nov. 22, 2011 which claims the benefit under 35 U.S.C. § 119(e)(1) of U.S. Provisional Patent Application No. 61/033,258, Cement Based Armor Panel System, filed Mar. 3, 2008, all the above incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

It is important to protect both material and personnel from catastrophe, especially in cases where the probability of occurrence is greater than the norm. Conventionally, both temporary and permanent means may be used for this purpose, depending on the scenario. For example, a permanent military facility may best be protected by a permanent configuration, whereas a mobile field unit would best be served by a temporary, but not necessarily less effective, configuration. Conventionally, protection against manmade catastrophe, such as occurs in war zones, has been provided with large bulky concrete structures or earthen embankments that require heavy equipment to produce, whether temporary or permanent. Needs for protective structure may include barriers to prevent personnel access, vehicular intrusion, or even line-of-site access in the case of a sniper, as well as protective enclosures for emergency response personnel or revetments for high value assets. Because of constraints such as geography, response time, availability of both material and heavy equipment, and the like, select embodiments of the present invention that provide good protection for both personnel and valued assets are of value for protection of both military and community assets.

To protect personnel and resources, military organizations use a variety of protective materials ranging from soil cover to expensive, high-performance, lightweight ballistic ceramics. A need exists for an inexpensive blast and fragmentation barrier for large-area applications, such as forward facilities, installation and structure perimeters, and both interior and exterior protective upgrades. Certain applications call for panels that may be emplaced on robust platforms, both the modular platform sections and panels being of sufficiently light weight to be man portable.

Select embodiments of the panels of the present invention have excellent energy absorbing capacity against blast and ballistic penetration forces. This capacity is often described as toughness, a term also associated with the tensile strength of concrete. Select embodiments of the panels of the present invention obtain their strength and toughness qualities through engineering of the type and quantity of component materials.

When combined with an elastic outer layer, the core of select embodiments of the panels of the present invention reduces fragment velocities as compared to existing core materials that cost more, weigh more, and require greater thickness to achieve the same kinetic energy reduction. Cost is reduced by employing high performance concrete materials as a core. Use of multi-dimensional, discrete and continuous fibers of various material compositions distributed throughout the core matrix optimizes strength and toughness. Coating or covering the inexpensive core with a tough pliable material provides the necessary "toughness" to dampen or completely eliminate through penetration of fragments and debris from an event such as a hurricane, nearby explosion or even penetration by munitions.

Select embodiments of the panels, roof and floor supports and the box-shaped platform modules of the present invention are man portable. Systems, such as walls, floors and roofs, employing select embodiments of the present invention are designed to replace existing systems that are heavier, e.g., those that employ thicker panels comprising materials conventionally used for protection from ballistic sources. Because some existing systems are made from exotic materials, such as ceramics, they are also more expensive than embodiments of the present invention.

A need also exists for inexpensive protective cladding with superior resistance to wind damage, including penetration of debris generated by natural forces, such as tornadoes and hurricanes. Although select embodiments of the present invention may be used as ballistic armor, connectors, protective construction, blast-resistant panels, protection against fragmenting munitions, vehicle up-armoring, and forced entry resistant structural elements. Other applications include strengthening of building components such as walls, floors and ceilings. Because select embodiments of the panels of the present invention have high strength and toughness, they are suitable for use in new construction of residential housing as structural members that are resistant to the natural forces and debris impact of tornadoes and hurricanes and in commercial security situations such as the construction of bank vaults and armor protective enclosures.

Select embodiments of the present invention include a Modular Protective System Overhead Cover (MPS-OHC) that fills an existing gap in a combat soldier's tool kit. The MPS-OHC is a unique structure that provides 360° of protection while its components are light enough to be man-portable and assembled by personnel without requiring special tools or heavy equipment. This allows the MPS-OHC to be attached to a combat unit, transported to remote locations, and deployed with hand tools. Currently, there is no known system capable of providing this protection with its reduced logistical demands.

The MPS-OHC safeguards personnel and material against direct and indirect weapons' fire. The MPS-OHC is similar in concept to the Overhead Coverage System (OCS) developed by the U.S. Army Engineer Research and Development Center (ERDC), USACE Middle East District (MED), Protective Design Center (PDC), in partnership with Perini and Tetra Tech design-build teams. The OCS, however, are permanent structures built over high-density facilities, such as housing units, medical buildings, and dining halls. Changes in the battlefield scenario and logistical constraints require that the next generation of enhanced force protection solutions be lightweight, modular, scalable, recoverable, and reusable. The MPS-OHC is intended to provide sidewall and overhead cover from direct and indirect fire threats in locations where conventional construction materials and equipment are not available or are not feasible or when a permanent structure would not be in line with mission requirements.

U.S. Armed Forces combat personnel operate in austere environments and face the threat of small arms and indirect fire. The MPS-OHC provides a rapidly deployable and rapidly recoverable structure that requires no heavy equipment or specialized tools for assembly. Possible uses include: overhead cover, sidewall protection, protection of living quarters, including tents, ballistic and fragmentation screen or shield, vehicle protection, personnel bunker, command post protection, guard post, fighting position, petroleum, oil and lubricants (POL) store protective cover, ammunitions holding area protection, and the like.

DETAILED DESCRIPTION

Select embodiments of the present invention envision a system of lightweight modular components that are assembled without heavy equipment or special tools to provide overhead cover protection, in addition to lateral cover protection. The system is re-usable and re-locatable by incorporating a lightweight modular column system.

Select embodiments of the present invention comprise transportable components for fortifying an area. Select embodiments of the present invention comprise lightweight roof trusses and connectors therefor. Select embodiments of the present invention include opaque blast and projectile resistant panels and rectangular box-shaped platform modules for holding the panels in order to provide a secure perimeter. The panels are resistant to sudden impulses such as may occur with explosions or impact with projectiles and also shield what they are protecting from view of possible adversaries.

In select embodiments of the present invention, the quadrilateral panels comprise a core of very high strength concrete having elastic material bonded to at least one side, the side defined by the length and the width of the quadrilateral panel, the depth or thickness of the panel much less than either the length or width. In select embodiments of the present invention, the quadrilateral panel incorporates elastic material bonded to both its sides. In select embodiments of the present invention, the quadrilateral panels incorporate elastic material bonded to the outside of the quadrilateral panel. In select embodiments of the present invention the elastic material completely encapsulates the panel.

In select embodiments of the present invention, the quadrilateral panels further comprise means for suspending them from the frame, e.g., grommets, tabs and the like.

In select embodiments of the panels of the present invention, inexpensive impact-resistant composite structures incorporate a core of an improved very high strength concrete (VHSC) and an external "skin" of elastic material. The skin may be applied to one or more sides of the structure or completely cover a structure, e.g., a rectangular panel could be covered on both sides and all four edges. Materials that form a composite structure of an embodiment of the present invention may include a core of a cementitious material such as COR-TUF™ (a high-performance VHSC) coupled with reinforced polymer-based facings placed on one or more sides of the VHSC core or completely enveloping the core. Note that VHSC is an accepted descriptor in the profession for high performance concrete. COR-TUF™ and methods for producing it are described in U.S. Pat. No. 7,744,690 B2 to Durst et al. (hereafter the '690 patent), issued Jun. 29, 2010, incorporated herein by reference. Further, the elastic material for covering the panels may be of the type described in U.S. patent publication 2009/000430 A1, Reinforced Elastomeric Configuration Tailored to Meet a User's Requirements for Protecting a Structure and a Structure Comprised Thereof, published Jan. 1, 2009 (hereafter the '430 publication), incorporated herein by reference. Methods for applying the elastomeric material to a panel are also provided in the '430 publication.

Figure 1:
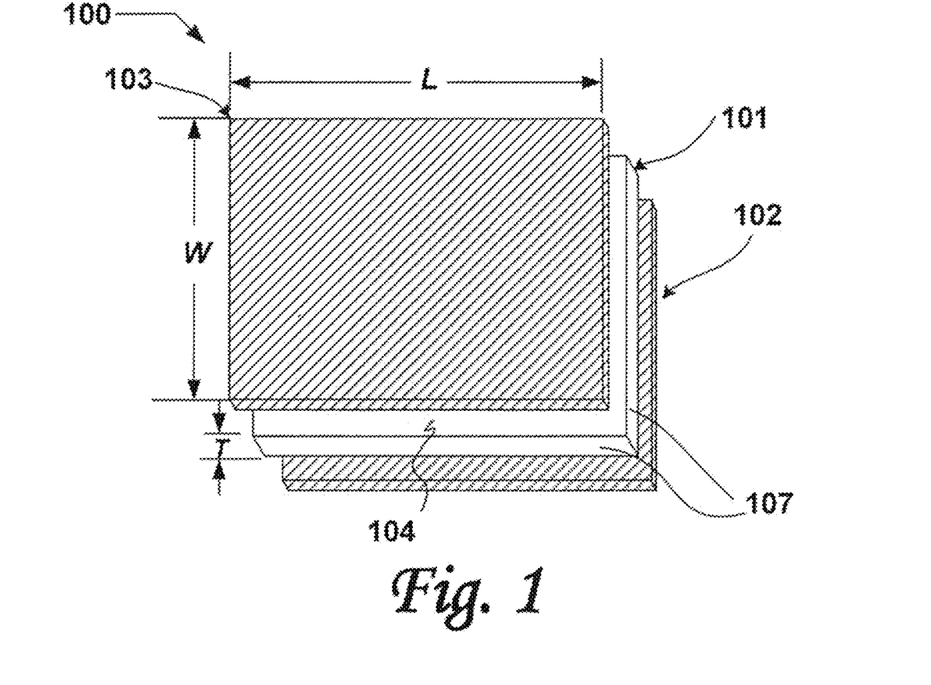
FIG. 1 is a perspective view of components of panels of a first generic embodiment of the panels that may be used with embodiments of the present invention.

Refer to FIG. 1 detailing major components of a panel 100 that may be employed in select embodiments of the present invention. In select embodiments of the present invention, a thin rectangular core 101 of length, L, width, W, and thickness, T, much less than either L or W, comprising a VHSC concrete such as COR-TUF™, has sheets 102, 103 of flexible or elastic (hereafter elastic) material affixed to each side 104 of the core 101. The elastic material may be in the form of sheets 102, 103, thin membranes, laminates and the like or "flowed on" a side 104 of the core 101 by spraying, rolling, brushing, troweling or the like. Multiple layers, such as thin membranes built up into a laminate, and the like, may be employed as the sheets 102, 103 of elastic material on any side of the core 101, each layer placed in accordance with manufacturer's instructions to insure proper adhesion of the resultant sheets 102, 103 of elastic material to the core 101. Multiple layers of fluid elastic material that solidifies upon curing may be applied to build up a veneer (sheet) 102, 103 of elastic material of appropriate thickness upon final cure. Each application coat of fluid material is applied in accordance with manufacturer's instructions to insure proper curing and adhesion of the sheets 102, 103 of elastic material to the core 101. For select embodiments of the present invention employing elastic material in the form of sheets 102, 103 of elastic material, to include such as thin membranes alone or thin membranes built into laminates, an adhesive may be applied to either or both the sheets 102, 103 of elastic material and the sides 104 of the core 101 in compliance with the manufacturer's instructions for the elastic material used for the sheets 102, 103 of elastic material and the adhesive. Sheets 102, 103 of elastic material, to include such as thin membranes and laminates thereof may be provided with a "peel and stick" type of adhesive that may permit ready adhesion of sheets 102, 103 of elastic material to a side 104 of the core 101 prepared in accordance with the manufacturer of the "peel and stick" type adhesive. In select embodiments of the present invention, the edges 107 of the core 101 need not be covered by the sheets 102, 103 of elastic material in order to achieve a desired level of performance.

Figure 2:
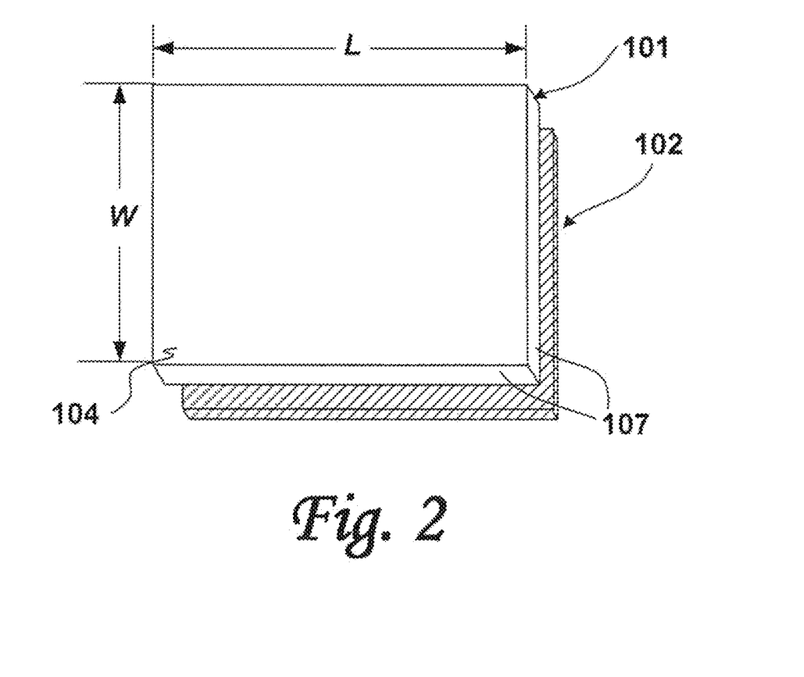
FIG. 2 is a perspective view of components of panels of a second generic embodiment of the panels that may be used with embodiments of the present invention.

Refer to FIG. 2 depicting the core 101 of FIG. 1. In select embodiments of the present invention only one side of the core 101 has a sheet 102 of elastic material adhered thereto. The type of elastic material used in the sheet 102 and method of application may be any of the types and methods used for the "double-sided" example of FIG. 1. Again, for select embodiments of the present invention, the edges 107 of the core 101 need not be covered by the single sheet 102 of elastic material in order to achieve a desired level of performance.

In select embodiments of the present invention both sides 104 and all four edges 107 of the core 101 have a sheet 102, 103 of elastic material adhered thereto. The type of elastic material used for the sheets 102, 103 of elastic material and method of application may be any of the types and methods used for the "double-sided" example of FIG. 1. Further, in select embodiments of the present invention, the elastic material incorporated in the sheets 102, 103 of elastic material may be reinforced with one or more "webs" of woven or un-woven reinforcement material. In select embodiments of the present invention, the webs of reinforcement material may comprise fabric incorporating polymer fibers. In select embodiments of the present invention, the webs of reinforcement material may comprise fabric incorporating polymer "strands" arranged in a matrix such that one set of strands runs at a "bias" (i.e., non-parallel) to the length, L, and the intersecting set of strands runs at a bias to the width, W, of the core 101. In select embodiments of the present invention, the finished "encapsulated" panel has edges that are also covered with sheets 102, 103 of elastic material that incorporate webs of reinforcement material.

In select embodiments of the present invention, sheets 102, 103 of elastic materials used for the "skin" of the composite may comprise a spun para-aramid fiber, e.g., KEVLAR®, ballistic grade E-glass, commercial E-glass, S2-glass, polypropylene thermoplastic sheet, polyurethane/polyurea-blended sheet, polyurethane films (with or without reinforcement), fiberglass, carbon fiber, metal mesh/grid fiber reinforced plastic (FRP), and the like. Where more than one layer of skin is applied as a sheet 102, 103, e.g., as a laminate, the layers may be of the same material and same thickness, same material different thicknesses, different materials of the same thickness or different materials of different thicknesses. Further, individual layers may be a composite of different material, e.g., a laminate of FRP and carbon fiber. The selection of materials depends on the amount of protection required and may also be subject to a cost/benefit constraint. The core 101 may comprise variants of hard armor material produced from high performance concretes, ceramics, quarried stone, various architectural armors, plastics and the like. To keep costs in line, portland cement-based VHSC's, such as COR-TUF™, are preferred.

In select embodiments of the present invention, a core 101 is prepared to accept one or more outer sheets 102, 103 of an elastic material, such as a polymer, by applying a compatible adhesive, such as an epoxy, to the sides 104 and to the surface of the sheets 102, 103 of elastic material, such as solid sheets of polymer, and mating the surfaces of the sheets 102, 103 to that of the surfaces of the sides 104 in accordance with the instructions of the adhesive manufacturer. In select embodiments of the present invention, the sheets 102, 103 may be attached via applying pressure to the back (top) surface of the sheets 102, 103 of elastic material. In select embodiments of the present invention, if the sheet 102, 103 of elastic material is applied in fluid form prior to curing to a flexible solid, e.g., either sprayed, brushed, trowelled or rolled on, the bonding mechanism is generally the fluid form of the elastic material itself, such as a sprayable polymer, and no adhesive is necessary. In select embodiments of the present invention, a "laid-up" composite panel is then allowed to cure in accordance with the instructions of the manufacturer of the material used to create the flexible solid sheets 102, 103 of elastic material.

In select embodiments of the present invention, the core 101 is a very high-strength, high-toughness cement-based material, e.g., a VHSC, that is very efficient at absorbing or reducing the kinetic energy of any impacting object, such as a fragment projected from a blast or deposited by wind.

In select embodiments of the present invention, one or more sheets 102, 103 of elastic material, such as a polymer sheet, trap impacting objects thereby increasing protection from airborne fragments as compared to the trapping capacity available from use of the core 101 alone. A sheet 102, 103 of elastic material, e.g., a polymer sheet, on the non-impact side (inside) 104 of a panel provides added resistance to punching shear in the core 101. Additionally, facing a core 101 with a high tensile strength (high "toughness") membrane on the impact side (outside) 104, further enhances the performance of the panel.

Select embodiments of the present invention may be employed in building construction products such as roofing tiles, wall panels, floor tiles, hurricane and tornado resistant structural elements, forced entry resistant structural elements and the like.

The ability to choose among many polymer materials for an appropriate sheet 102, 103 of elastic material makes various embodiments of the present invention suitable for use in a variety of military, first responder, commercial, industrial and consumer applications.

Further, select embodiments of the present invention employing adhered thin film sheets (membranes) 102, 103 have the potential for manufacture in remote or austere locations using a minimal amount of specialized equipment. This may significantly reduce cost, including transportation, where the panels are to be used near the site of fabrication.

Figure 3:
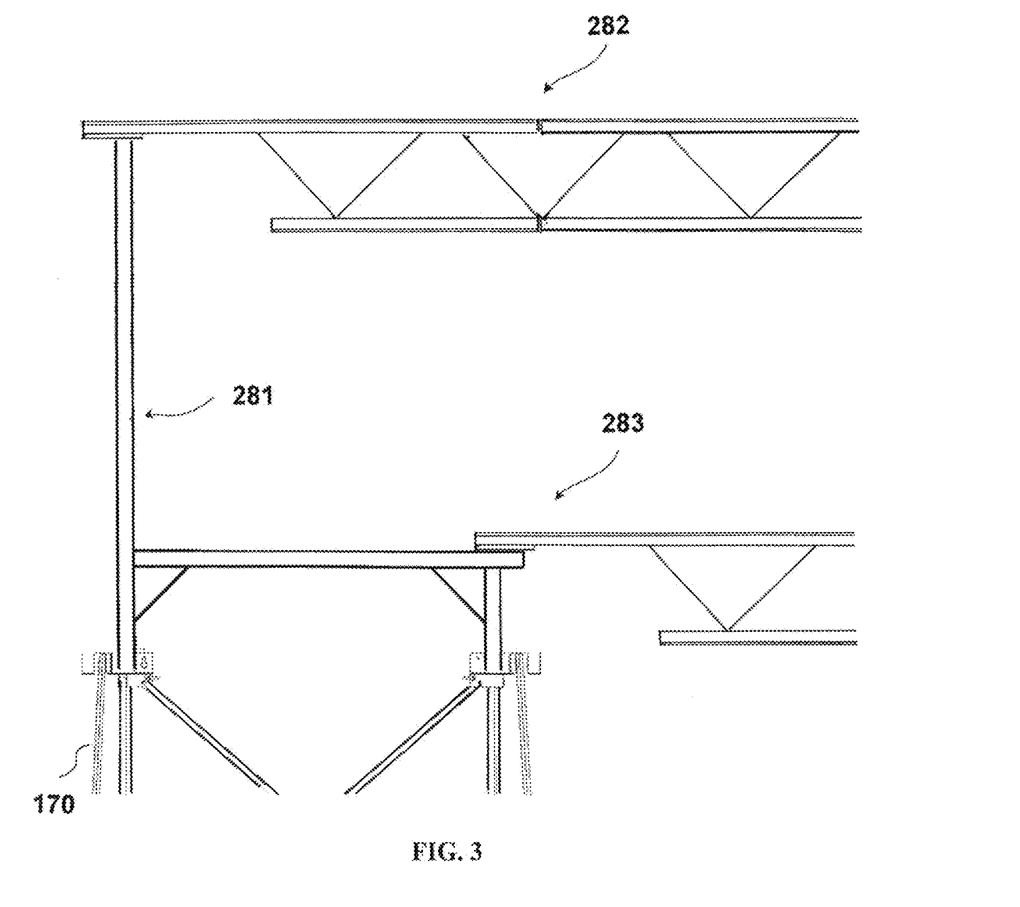
FIG. 3 shows joists bolted together, including end joists, which may be used to support first and second coverings for select embodiments of the present invention.

Refer to FIG. 3 showing detail of roof frames 281 and joists 282, 283 for a protective double roof as may be used with select embodiments of the present invention.

Refer to FIG. 3 showing detail of roof frames 281 and upper 282 and lower 283 bar joists for spanning between walls 170 as may be used with select embodiments of the present invention.

In embodiments of the invention all modules (components) used in constructing a protective wall, roof, or complete enclosure are "human portable," i.e., no specialized mechanical equipment (e.g, cranes, forklift, etc.) is required for handling, packaging for transport, unloading, assembling and/or fabrication of the individual components into a finished protective structure, regardless of the particular configuration.

Figure 4:
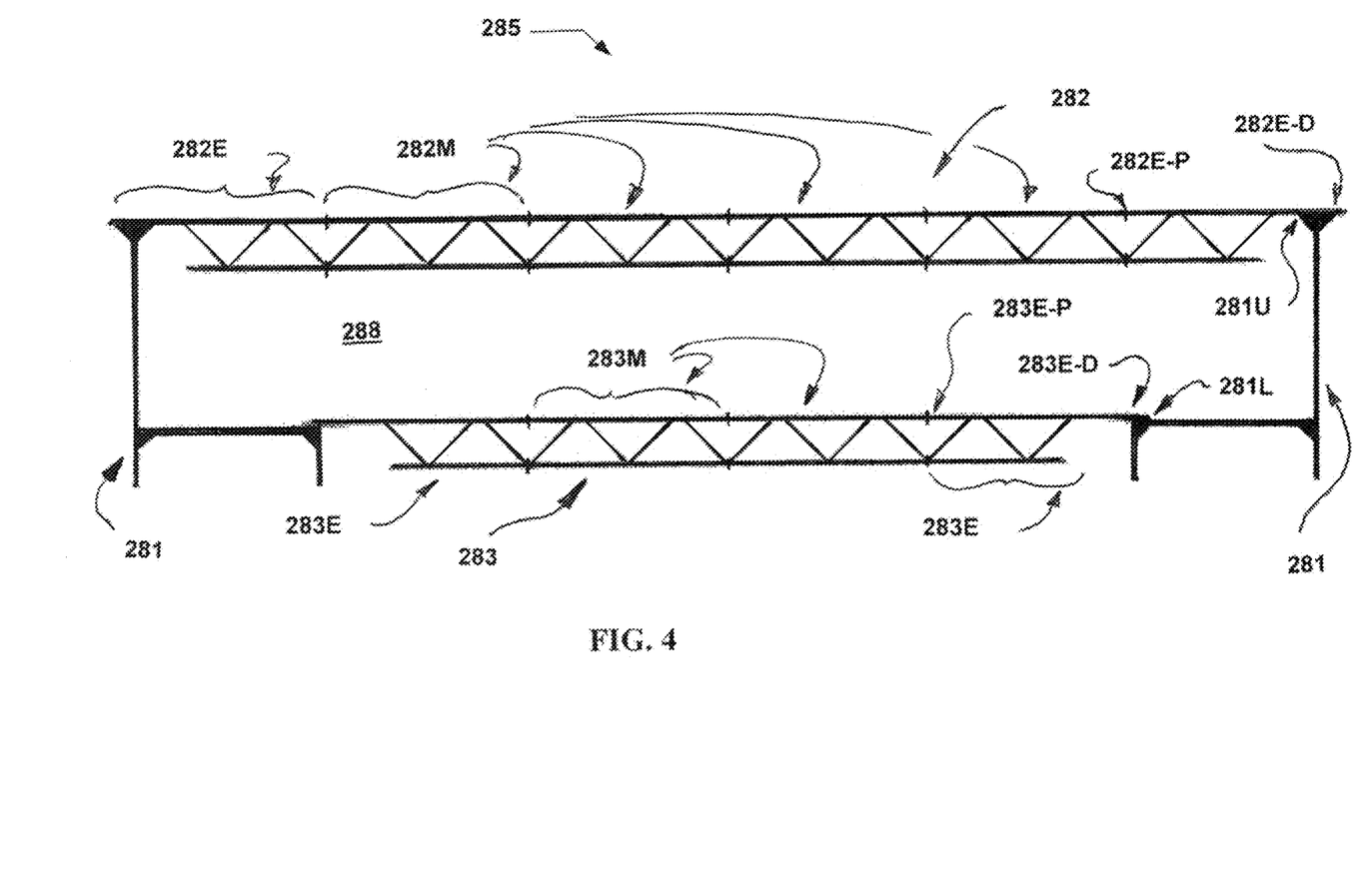
FIG. 4 shows a side elevation of a double layer roof in accordance with an embodiment of the invention.

In embodiments of the invention, for example shown in FIG. 4, a human portable, modular double joist assembly (285) comprises an upper bar joist, a lower bar joist and two roof frames; said (i) a lower bar joist (283) having two opposed ends and comprising a plurality of lower bar joist middle sections (283M) connected to each other in an end-to-end configuration to form a center section of said lower bar joist having two opposed ends, and having two lower bar joist end sections (283E), each of said lower bar joist end sections having a distal end (283E-D) and a proximal end (283E-P), the proximal ends of each lower bar joist end section being attached to an opposed end of said center section of said lower bar joist; wherein the distal ends of said two lower bar joist end sections also define the opposed ends of said lower bar joist; and wherein said two opposed ends of said lower bar joist are each in contact with a lower contact portion (281L) of one of the two roof frames (281), (ii) said roof frames having said lower contact portion and an upper contact portion (281U), said (iii) a upper bar joist (282) having two opposed ends and comprising a plurality of upper bar joist middle sections (282M) connected to each other in an end-to-end configuration to form a center section of said upper bar joist having two opposed ends, and having two upper bar joist end sections (282E), each of said upper bar joist end sections having a distal end (282E-D) and a proximal end (282E-P), the proximal ends of each upper bar joist end section being attached to an opposed end of said center section of said upper bar joist; wherein the distal ends of said two upper bar joist end sections also define the opposed ends of said upper bar joist; and wherein said two opposed ends of said upper bar joist are each in contact with an upper contact portion (281U) of one of the two roof frames (281), and wherein said upper bar joist, a lower bar joist and two roof frames define an inner, enclosed portion (288).

Figure 5:
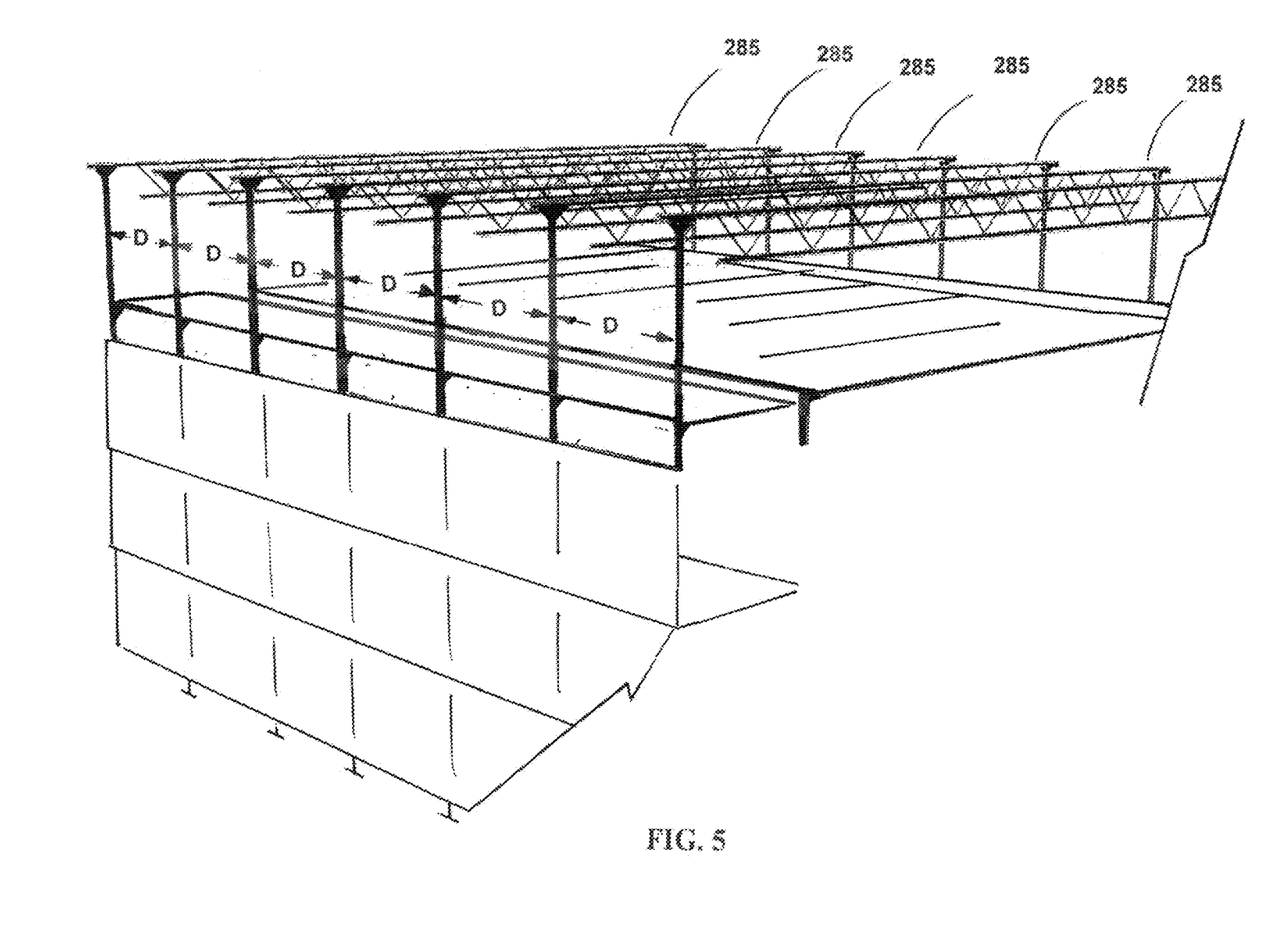
FIG. 5 shows an isometric view of a double layer roof in accordance with an embodiment of the invention installed between two sidewall sections wherein the top roof panel has not been installed.
Figure 6:
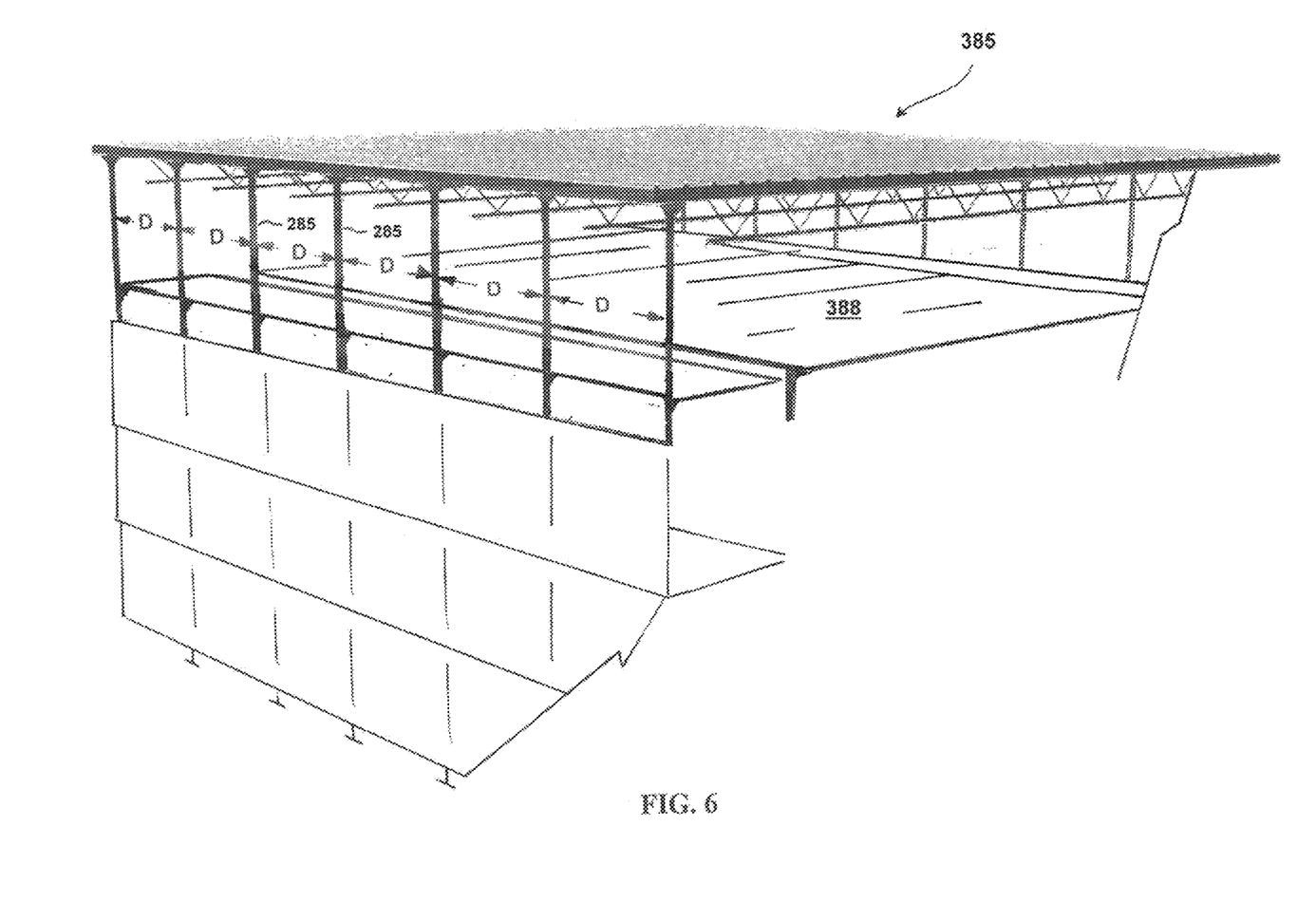
FIG. 6 shows the structure of FIG. 5 with the top roof layer installed.

In embodiments of the invention, for example shown in FIG. 5 and FIG. 6, a human portable, modular double roof assembly comprises (i) (n+1) modular double joist assemblies (285) arranged successively, at a depth distance D from one another, along and on top of substantially parallel walls, and said double joist assemblies being substantially perpendicular to one another, wherein said double joist assemblies are configured at both upper (282) and lower (283) joist assemblies to receive upper panel pieces and lower panel pieces; (ii) upper roof panel pieces to completely fill an upper space between said (n+1) successive double joist assemblies (285), (iii) lower roof panel pieces to completely fill a lower space between said (n+1) successive double joist assemblies (285), wherein n=1 to 20 and wherein an enclosed cavity (388) is therein defined.

Figure 7:
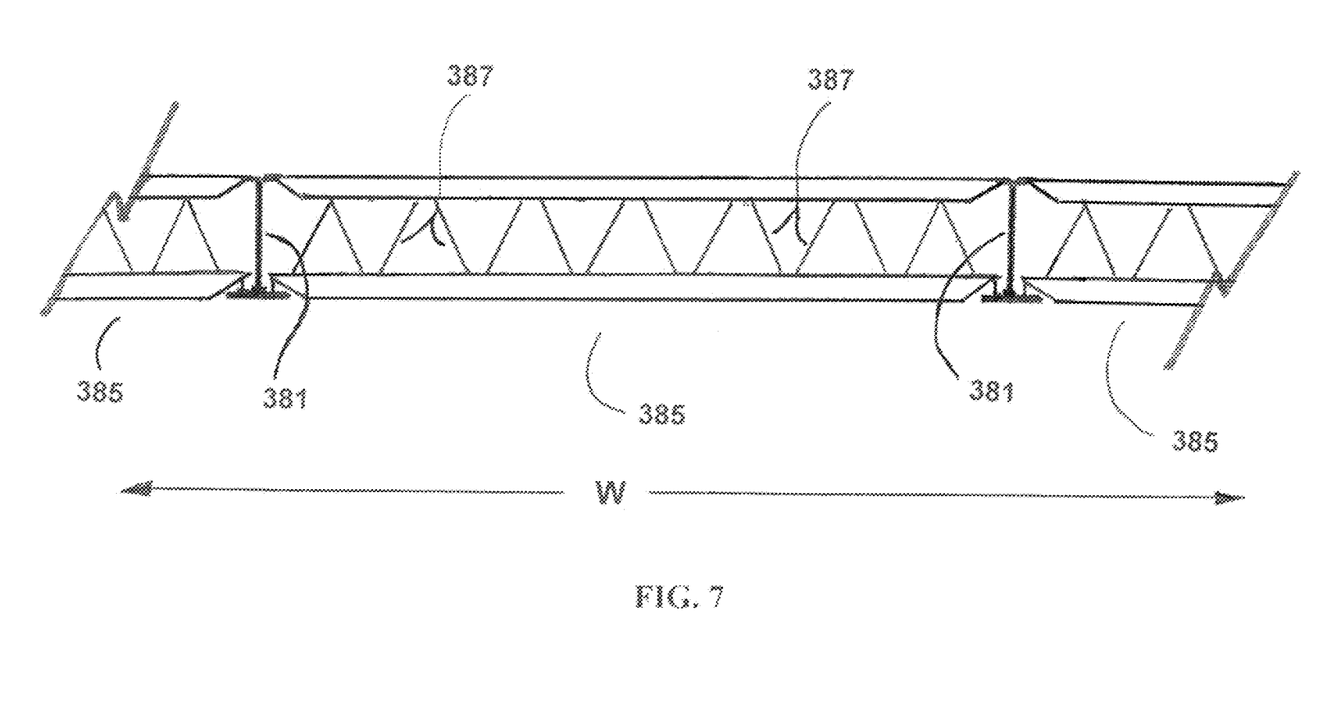
FIG. 7 shows a detail of a roof truss in accordance with embodiments of the invention.

In embodiments of the invention, for example shown in FIG. 7, a human portable, modular, extended width double joist assembly (385) comprises an upper bar joist, a lower bar joist, diagonal bracing and two roof frames; said (i) a lower bar joist having two opposed ends and comprising a plurality of lower bar joist middle sections connected to each other in an end-to-end configuration to form a center section of said lower bar joist having two opposed ends, and having two lower bar joist end sections, each of said lower bar joist end sections having a distal end and a proximal end, the proximal ends of each lower bar joist end section being attached to an opposed end of said center section of said lower bar joist; wherein the distal ends of said two lower bar joist end sections also define the opposed ends of said lower bar joist; and wherein said two opposed ends of said lower bar joist are each in contact with a lower contact portion of one of the two roof frames, (ii) said roof frames having said lower contact portion and an upper contact portion, said (iii) a upper bar joist having two opposed ends and comprising a plurality of upper bar joist middle sections connected to each other in an end-to-end configuration to form a center section of said upper bar joist having two opposed ends, and having two upper bar joist end sections, each of said upper bar joist end sections having a distal end and a proximal end, the proximal ends of each upper bar joist end section being attached to an opposed end of said center section of said upper bar joist; wherein the distal ends of said two upper bar joist end sections also define the opposed ends of said upper bar joist; and wherein said two opposed ends of said upper bar joist are each in contact with an upper contact portion of one of the two roof frames, and wherein said upper bar joist, a lower bar joist and two roof frames define an inner, enclosed portion; and wherein said enclosed portion contains at least one pair of diagonally oriented cross-braces (387) connecting said upper bar joist to said lower bar joist.

In embodiments of the invention, for example shown in FIG. 7, the double joist assembly of 385 has upper and lower bar joists equal in length. In embodiments of the invention, for example shown in FIG. 4, the double joist assembly of 285 has upper and lower bar joists unequal in length. Also shown in FIG. 7 is the concept of having multiple roof sections on either side of the roof brace, in this instance an inverted "T" shape brace.

Adjacent sections of double joist assembly may have diagonal bracing between either upper bar joist sections, lower bar joist sections, or both. Typically, diagonal bracing is not necessary between adjacent sections of double joist assembly. This is an advantage of the invention wherein personnel can maneuver within the confines of the space during the final stages of assembly quickly, without having to maneuver around such diagonal bracing between adjacent sections of double joist assembly 285 or 385 (extended width).

Figure 8A:
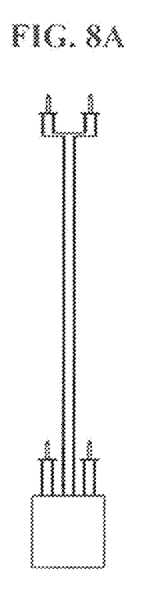
FIGS. 8A, 8B and 8C show, respectively, a side view, a front view and an isometric view of a T-wall attachment in accordance with an embodiment of the invention.
Figure 8B:
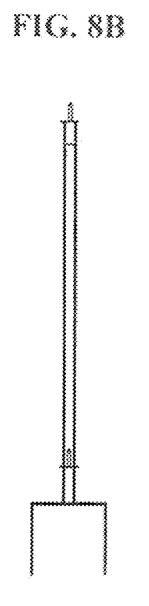
Figure 8C:
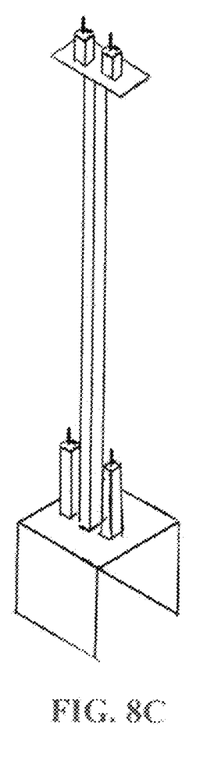

In embodiments of the invention the roof frame has an inverted "T" shape. FIGS. 8A, 8B and 8C show a roof frame having an "I" shape. The roof frame may be "L" shaped as shown in FIG. 4.

In embodiments of the invention, the roof assembly is supported on walls are selected from the group consisting of modular walls, concrete walls, soil revetments and combinations thereof.

In embodiments of the invention, the roof assembly has lower and/or upper roof panel pieces having skin materials (102,103) which are selected from the group consisting of spun para-aramid fiber, ballistic-grade E-glass, commercial E-glass, S2-glass, polypropylene thermoplastic sheet, polyurethane/polyurea-blended sheet, polyurethane films (with or without reinforcement), fiberglass, carbon fiber, metal mesh/grid fiber reinforced plastic (FRP) and combinations thereof.

In embodiments of the invention, the roof assembly has lower and/or upper roof panel pieces with core materials (101) which are selected from the group consisting of high performance concretes, ceramics, quarried stone, architectural armors and portland cement-based VHSC's.

In embodiments of the invention, the roof assembly may have multiple layers of upper roof panel pieces, and the thickness may be from 2 inches to 10 inches, or from 4 inches to 6 inches.

In embodiments of the invention, an advantage of the invention is that shipping containers may be pre-packaged with "kits" comprising all the pieces necessary to manufacture any possible configuration for transportation to their intended assembly site.

In embodiments of the invention, a further advantage is that connections may be made without the use of traditional fasteners (nuts/bolts) and therefore eliminating the need for special hand tools and/or torquing requirements which may be difficult to obtain and/or accomplish in a field environment. Pin connections may be used between joists and roof frames as shown in FIGS. 8A, 8B and 8C. A sliding collar which locks in place with locking, sliding pins may be used to connect adjacent sections of upper and/or lower bar joists.

Field assembly factors are various, including unlevel terrain, other difficult conditions causing concern for personnel such as sniper fire, bad weather or wind, etc. and for that reason all elements may not be true, plumb, and/or level. For that reason, "substantially perpendicular" in this application may mean $90°±5°$, or even $90°±10°$. For the same reasons "substantially parallel" in this application may mean $±5°$ from parallel, or even $±10°$ from parallel.

The abstract of the disclosure is provided to comply with the rules requiring an abstract that will allow a searcher to quickly ascertain the subject matter of the technical disclosure of any patent issued from this disclosure. 37 CFR § 1.72(b). Any advantages and benefits described may not apply to all embodiments of the invention.

While the invention has been described in terms of some of its embodiments, those skilled in the art will recognize that the invention can be practiced with modifications within the spirit and scope of the appended claims. For example, although the system is described in specific examples for use in protecting assets, it may be used for any type of portable structure where physical or visual restriction or even noise suppression is desired. Thus select embodiments of the present invention may be useful in such diverse applications as mining, logging, construction, outdoor concerts, parades, and the like. In the claims, means-plus-function clauses are intended to cover the structures described herein as performing the recited function and not only structural equivalents, but also equivalent structures. Thus, although a nail and screw may not be structural equivalents in that a nail employs a cylindrical surface to secure wooden parts together, whereas a screw employs a helical surface, in the environment of fastening wood parts, a nail and screw may be equivalent structures. Thus, it is intended that all matter contained in the foregoing description or shown in the accompanying drawings shall be interpreted as illustrative rather than limiting, and the invention should be defined only in accordance with the following claims and their equivalents.

What is claimed is:

1. A human portable, modular double roof assembly comprising (i) (n+1) modular double joist assemblies arranged successively, at a depth distance D from one another, along and on top of substantially parallel walls, and said double joist assemblies being substantially perpendicular to one another, wherein said double joist assemblies are configured at both an upper joist assembly and a lower joist assembly to receive upper panel pieces and lower panel pieces (ii) upper roof panel pieces to completely fill an upper space between said (n+1) successive double joist assemblies, (iii) lower roof panel pieces to completely fill a lower space between said (n+1) successive double joist assemblies, wherein n=1 to 20 and wherein an enclosed cavity is therein defined, wherein the lower roof panel pieces have skin materials which are selected from the group consisting of spun para-aramid fiber, ballistic-grade E-glass, commercial E-glass, S2-glass, polypropylene thermoplastic sheet, polyurethane/polyurea-blended sheet, polyurethane films (with or without reinforcement), fiberglass, carbon fiber, metal mesh/grid fiber reinforced plastic (FRP) and combinations thereof.

2. A kit for assembly comprising the individual pieces of the human portable, modular double roof assembly of claim 1.

3. The roof assembly of claim 1 wherein said walls are selected from the group consisting of modular walls, concrete walls, soil revetments and combinations thereof.

4. The roof assembly of claim 1 wherein said upper joist assembly and said lower joist assembly have a single piece, unitary construction.

5. The roof assembly of claim 1 wherein said upper joist assembly and said lower joist assembly are constructed from multiple pieces.

6. The roof assembly of claim 1 wherein said upper joist assembly and said lower joist assembly are of equal length.

7. A human portable, modular double roof assembly comprising (i) (n+1) modular double joist assemblies arranged successively, at a depth distance D from one another, along and on top of substantially parallel walls, and said double joist assemblies being substantially perpendicular to one another, wherein said double joist assemblies are configured at both an upper joist assembly and a lower joist assembly to receive upper panel pieces and lower panel pieces; (ii) upper roof panel pieces to completely fill an upper space between said (n+1) successive double joist assemblies, (iii) lower roof panel pieces to completely fill a lower space between said (n+1) successive double joist assemblies, wherein n=1 to 20 and wherein an enclosed cavity is therein defined, wherein the upper roof panel pieces have skin materials which are selected from the group consisting of spun para-aramid fiber, ballistic-grade E-glass, commercial E-glass, S2-glass, polypropylene thermoplastic sheet, polyurethane/polyurea-blended sheet, polyurethane films (with or without reinforcement), fiberglass, carbon fiber, metal mesh/grid fiber reinforced plastic (FRP) and combinations thereof.

8. The roof assembly of claim 7 wherein there are multiple layers of upper roof panel pieces.

9. The roof assembly of claim 8 having a thickness of from 4 inches to 6 inches.

10. A kit for assembly comprising the individual pieces of the human portable, modular double roof assembly of claim 7.

11. The roof assembly of claim 7 wherein said walls are selected from the group consisting of modular walls, concrete walls, soil revetments and combinations thereof.

12. The roof assembly of claim 7 wherein said upper joist assembly and said lower joist assembly have a single piece, unitary construction.

13. The roof assembly of claim 7 wherein said upper joist assembly and said lower joist assembly are constructed from multiple pieces.

14. The roof assembly of claim 7 wherein said upper joist assembly and said lower joist assembly are of unequal length.

* * * * *